(12) United States Patent
Hartmann et al.

(10) Patent No.: US 7,381,149 B2
(45) Date of Patent: Jun. 3, 2008

(54) METHOD AND DEVICE FOR OPERATING A DRIVE UNIT

(75) Inventors: Dirk Hartmann, Stuttgart (DE); Werner Mezger, Eberstadt (DE); Andreas Roth, Muehlacker-Lomersheim (DE); Juergen Rappold, Ilsfeld-Auenstein (DE); Georg Mallebrein, Korntal-Muenchingen (DE); Nikolas Poertner, Stuttgart (DE); Henri Barbier, Schwieberdingen (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 11/471,400

(22) Filed: Jun. 19, 2006

(65) Prior Publication Data

US 2007/0015629 A1 Jan. 18, 2007

(30) Foreign Application Priority Data

Jul. 18, 2005 (DE) ...................... 10 2005 033 523

(51) Int. Cl.
*B60W 10/10* (2006.01)
(52) U.S. Cl. .................. 477/110; 477/107; 477/111; 477/115
(58) Field of Classification Search ............. 477/107, 477/110, 111, 115; 701/102, 110
See application file for complete search history.

(56) References Cited

U.S. PATENT DOCUMENTS

| | | | | |
|---|---|---|---|---|
| 5,233,523 A | * | 8/1993 | Follmer ........................ | 701/51 |
| 5,616,100 A | * | 4/1997 | Sakai et al. .................. | 477/169 |
| 5,810,692 A | * | 9/1998 | Takiguchi et al. ........... | 477/144 |
| 6,623,401 B2 | * | 9/2003 | Idogawa et al. .............. | 477/54 |
| 7,059,997 B2 | * | 6/2006 | Nishizawa et al. ............ | 477/3 |

* cited by examiner

*Primary Examiner*—David D. Le
(74) *Attorney, Agent, or Firm*—Kenyon & Kenyon LLP (57) ABSTRACT

A method and a device for operating a drive unit provide a switch between half-engine operation and full-engine operation. A switch takes place between two operating states of a first component of the drive unit as a function of a first performance quantity of the drive unit. A switch takes place between two operating states of a second component of the drive unit as a function of a second performance quantity of the drive unit. A check is performed whether switching between two operating states of the second component results in a shift of the first performance quantity over a switching threshold for switching between two operating states of the first component, and if so, the switch between the two operating states of second component is delayed until a switch between the two operating states of first component has occurred.

12 Claims, 5 Drawing Sheets

METHOD AND DEVICE FOR OPERATING A DRIVE UNIT

FIELD OF THE INVENTION

The present invention relates to a method and a device for operating a drive unit including an engine and a transmission.

BACKGROUND INFORMATION

In conventional methods for operating a drive unit of a vehicle, the drive unit including an engine as a first component and a transmission as a second component, the drive unit is operated as a function of the engine speed in different operating states of the engine having different engine configurations. In a first configuration, the engine is operated in a full-engine operation, for example, and in a second configuration in a half-engine operation, for example. Furthermore, the drive unit is operated as a function of the engine speed in different operating states of the transmission having different transmission configurations. The different operating states of the transmission differ regarding the transmission ratio, i.e., the gear. Switching between full-engine operation and half-engine operation takes place as a function of the engine speed. Switching between different transmission ratios also takes place as a function of the engine speed.

SUMMARY

In accordance with the present invention, a drive unit is provided with a first component and a second component, the drive unit being operated in different operating states of the first component having different configurations of the first component as a function of at least one first performance quantity of the drive unit, the drive unit being operated in different operating states of the second component having different configurations of the second component as a function of at least one second performance quantity, a switch being performed between two operating states of the first component having a different configuration of the first component as a function of the at least one first performance quantity of the drive unit, a switch being performed between two operating states of the second component having a different configuration of the second component as a function of the at least one second performance quantity of the drive unit, a check being performed whether a switch between two operating states of the second component results in a shift of the at least one first performance quantity over a switching threshold for switching between two operating states of the first component, and in this case of a positive check result, the switch between the two operating states of the second component is delayed at least until a switch between the two operating states of the first component has occurred. In this manner, a switch between the two operating states of the first component is ensured, without potential damage to the switching mechanism required for the switch.

It is advantageous if the above-described check of whether a switch between two operating states of the second component results in a shift of the at least one first performance quantity over a switching threshold for switching between two operating states of the first component is performed in response to an indicated switching intent for switching between the two operating states of the second component. In this way, the frequency of the checking procedure may be minimized.

A further advantage results if, in the event of a positive check result, the switch is caused between the two operating states of the first component. In this way, it is ensured that the switching intent for switching between the two operating states of the second component may also be implemented.

A further advantage results if the switch between the two operating states of the second component is delayed for a waiting time which is at least as long as the time required for the switch between the two operating states of the first component. This ensures in a particularly simple manner that the switch between the two operating states of the second component does not take place until after the switch between the two operating states of the first component. An exchange of signals between the two components, i.e., between the control units of the two components, containing information about the particular switching state of the corresponding component to control the coordination of the switch between the two operating states of the first component and the switch between the two operating states of the second state, may also be omitted.

Another advantage results if the switching intent is generated only if it has been previously found that the at least one first performance quantity is within a predefined range (interval) from the switching threshold. In this way, a switch between the two operating states of the second component which is unwanted from the point of view of the switch between the two operating states of the first component may be reliably prevented.

However, in order to ensure that a switch between two operating states of the second component, which does not result in a switch between two operating states of the first component, is not unnecessarily blocked, the above-mentioned range (interval) may be simply selected in such a way that a shift of the at least one first performance quantity over the threshold value for switching between the two operating states of the first component due to a switch between the two operating states of the second component is to be expected only in the case of a value of the at least one first performance quantity within the predefined range (interval).

The coordination of the operating state switch may be implemented in a particularly simple and reliable manner by not performing the switch between the two operating states of the second component until after an enable has been set, after the switch between the two operating states of the first component has been completed.

In an example implementation of the present invention, the at least one first performance quantity is selected to be equal to the at least one second performance quantity, e.g., as the engine speed.

It is furthermore advantageous if the first component is the engine and the second component is the transmission. Different engine operating states may simply have different numbers of engine cylinders in operation. Similarly, different transmission operating states may simply have different transmission ratios.

DETAILED DESCRIPTION

Figure 1:
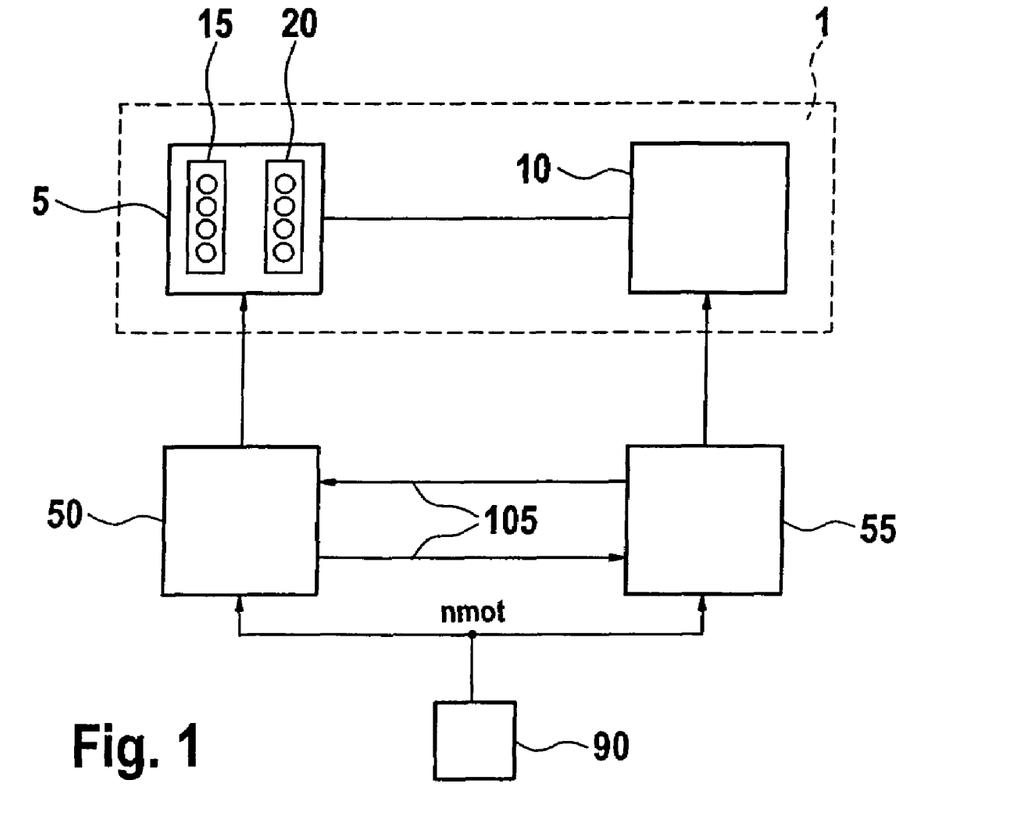
FIG. 1 shows a block diagram of a drive unit having an associated controller.

In FIG. 1, a drive unit 1 which drives a vehicle, for example, includes a first component 5 and a second component 10, which are operatively linked together. First component 5 may be an engine, for example, and second component 10 may be a transmission, for example. Engine 5 may include a plurality of engine banks 15, 20, for example; in the present example according to FIG. 1, engine 5 includes a first cylinder bank 15 and a second cylinder bank 20. Engine 5 may be designed as an internal combustion engine, e.g., a gasoline engine or a diesel engine. When the engine is designed as an internal combustion engine, each engine bank 15, 20 includes a certain number of cylinders; in the present example, four cylinders are indicated for each engine bank 15, 20. An engine controller 50 controls engine 5 for operation in different engine operating states. In a first engine operating state, known as full-engine operation, all cylinders of both engine banks 15, 20 are operated, i.e., fuel is injected into all cylinders either directly or via an intake manifold, and the valve gear of the intake and exhaust valves of the cylinders is activated. In a second operating state of the engine, known as half-engine operation, one-half of the cylinders are shut off by shutting off the gear of their intake and exhaust valves, as well as the injection. The half-engine operation may be implemented as cylinder or bank shutoff. In cylinder shutoff, one-half of the cylinders are shut off, regardless in which engine bank 15, 20 they are located. In bank shutoff, all cylinders of one of the two engine banks 15, 20 are shut off. To ensure the smoothest possible engine run in half-engine operation, every other cylinder in the ignition sequence is shut off.

Figure 6:
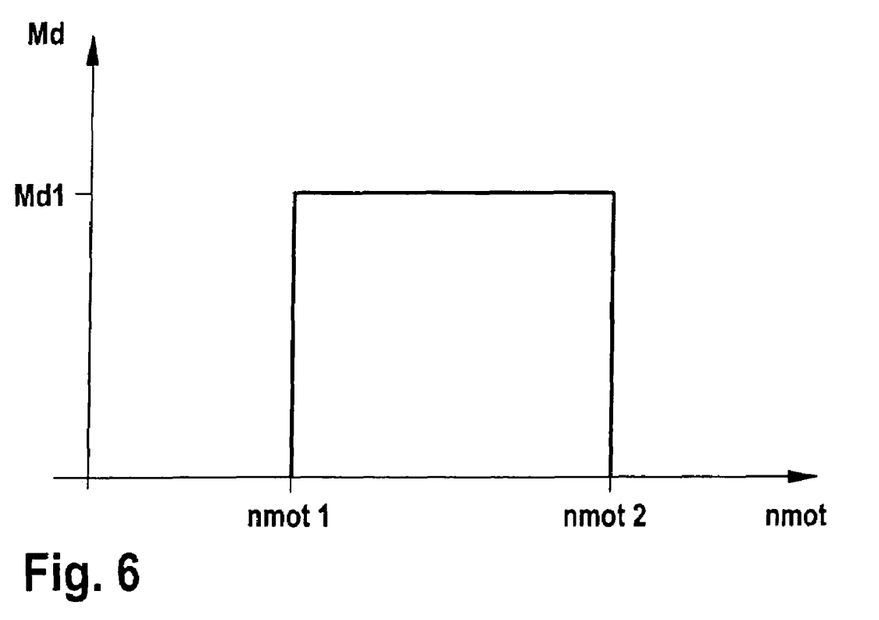
FIG. 6 shows a torque/engine speed diagram illustrating different engine operating states.

Half-engine operation is only possible in a narrow range of operation, as shown in FIG. 6 as an example. FIG. 6 shows a torque/engine speed diagram in which engine torque Md is plotted against engine speed nmot. Two speed thresholds are shown in FIG. 6. A first speed threshold is labeled nmot1 and a second speed threshold is labeled nmot2>nmot1. Furthermore, an engine torque threshold Md1 is shown. Half-engine operation is now possible only for engine speeds for which nmot1<nmot<nmot2. Furthermore, half-engine operation is only possible for engine torques for which 0≦Md<Md1. Speed thresholds nmot1, nmot2, and engine torque threshold Md1 may be calibrated, for example, on a test bench.

The first, smaller speed threshold nmot1 must be selected in such a way as to make it possible to switch from half-engine operation to full-engine operation again for decreasing engine speeds. To do so, a certain engine oil pressure is required, for example, which is no longer available at decreasing engine speed. First speed threshold nmot1 must therefore be calibrated in such a way that the engine oil pressure required for switching between half-engine operation and full-engine operation at decreasing engine speeds is still available. Second speed threshold nmot2 must be calibrated in such a way as to make reliable switching from half-engine operation to full-engine operation with increasing engine speed possible. As the engine speed increases, the time for a camshaft revolution becomes shorter and thus the switching window for switching between half-engine operation and full-engine operation becomes smaller. However, a mechanical minimum switching time is required for switching between half-engine operation and full-engine operation. Second speed threshold nmot2 must therefore be selected in such a way that the available switching window is still sufficient to implement the minimum required switching time for switching between half-engine operation and full-engine operation. If the switching window is too small, i.e., second speed threshold nmot2 is too high, the switching mechanism may be damaged when switching between half-engine operation and full-engine operation.

Instantaneous engine speed nmot is detected by a speed sensor 90 or modeled as a function of other performance quantities of drive unit 1, and nmot is supplied to engine controller 50, which is thus able to decide, as a function of engine speed nmot and speed thresholds nmot1 and nmot2, whether a switchover must be performed from half-engine operation to full-engine operation or from full-engine operation to half-engine operation. If engine speed nmot exceeds first speed threshold nmot1, engine controller 50 causes a switchover from full-engine operation to half-engine operation. If the engine speed nmot exceeds second speed threshold nmot2, engine controller 50 causes a switchover from half-engine operation to full-engine operation. If engine speed nmot drops below second speed threshold nmot2, engine controller 50 causes a switchover from full-engine operation to half-engine operation. If engine speed nmot drops below first speed threshold nmot1, engine controller 50 causes a switchover from half-engine operation to full-engine operation. If necessary, a hysteresis threshold may be provided for the switch between full-engine operation and half-engine operation.

The above-described calibration of speed thresholds nmot1, nmot2 ensures that the half-engine operation may be implemented in the greatest possible engine speed range. Half-engine operation has advantages over full-engine operation regarding emission of pollutants and fuel consumption.

A transmission controller 55 is also provided, to which instantaneous engine speed nmot is supplied by speed sensor 90 and which controls transmission 10. Transmission controller 55 sets different transmission ratios on transmission 10 as a function of engine speed nmot. For this purpose, transmission 10 may be designed as an automatic transmission, for example. In the following it is assumed that a transmission operating state is associated with a transmission ratio in such a way that switching between two transmission operating states by transmission controller 55 means switching between two transmission ratios. A bidirectional communication channel 105 is set up between engine controller 50 and transmission controller 55, via which engine controller 50 and transmission controller 55 may exchange status information and/or instructions.

Figure 2:
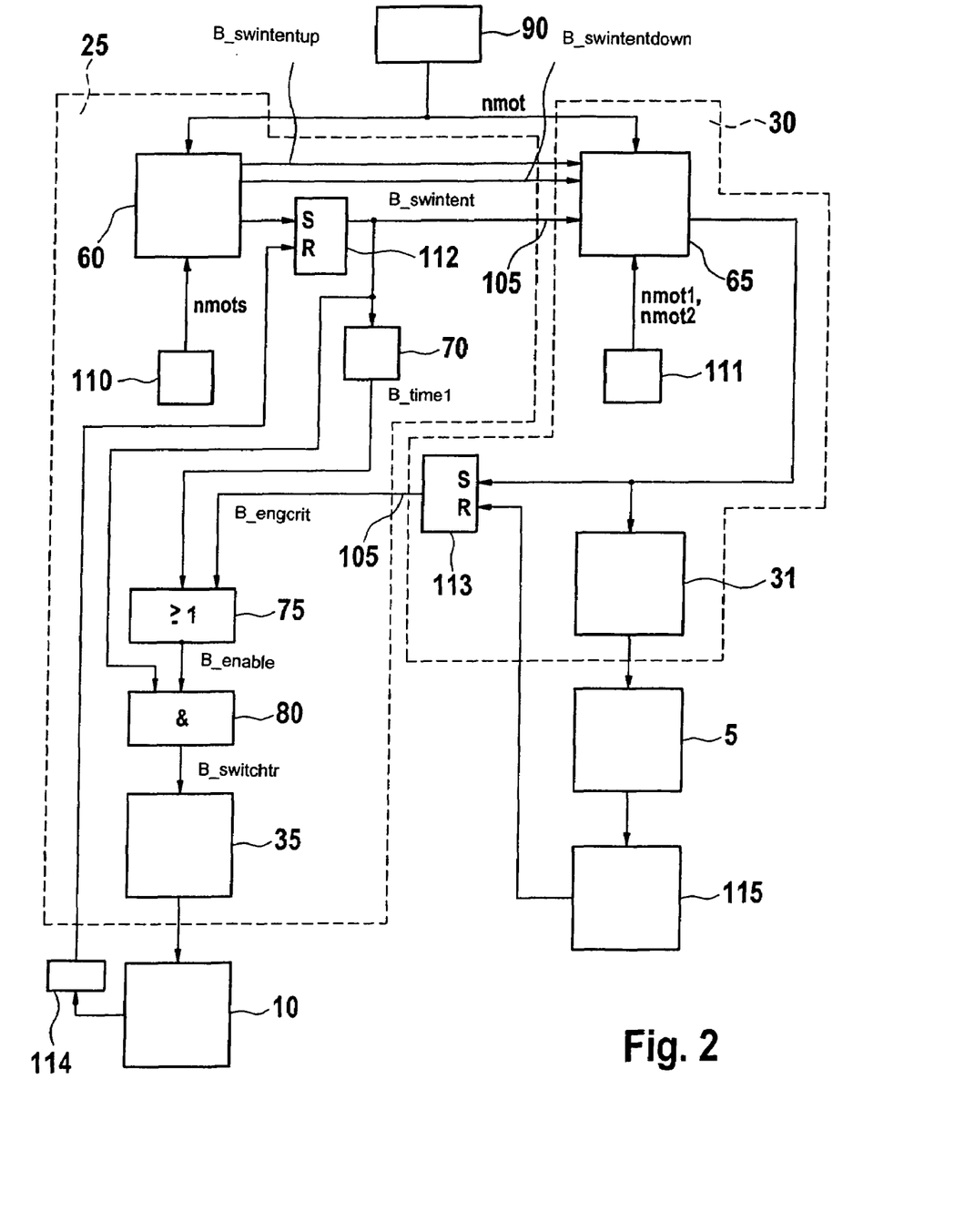
FIG. 2 shows a function diagram illustrating a first example embodiment of the present invention.

FIG. 2 shows a function diagram for illustrating a first example embodiment of the present invention. The function diagram includes a first function block 25, which may be implemented, for example, in transmission controller 55 as software and/or hardware. Furthermore, the function diagram shows a second function block 30, which may be implemented, for example, as software and/or hardware in engine controller 50.

Instantaneous engine speed nmot is supplied by speed sensor 90 to both first function block 25 and second function block 30. First function block 25 includes a first testing unit 60, which receives instantaneous engine speed nmot from speed sensor 90 and one or more speed threshold values nmots from a first threshold value memory 110. Speed threshold values nmots designate transmission threshold values for switching between two different transmission ratios. First testing unit 60 checks, using a plurality of consecutively received speed values from speed sensor 90, whether instantaneous speed nmot is more or less than one of the speed threshold values nmots delivered by first threshold value memory 110. If this is the case, an output signal of first testing unit 60 is set. This output signal is supplied to a setting input of a first set-reset element 112, for example, a flip-flop. The output of first set-reset element 112 is thus also set. The output of first set-reset element 112 represents a switching intent signal labeled as B_swintent, which is transmitted to a second testing unit 65 in second function block 30 via communication channel 105, which may be designed as a CAN bus, for example. The B_swintent signal is an instruction signal. Instantaneous engine speed nmot is supplied to second testing unit 65 by speed sensor 90. Furthermore, speed thresholds nmot1, nmot2 are supplied to second testing unit 65 by a second threshold memory 111 according to FIG. 6.

Speed thresholds nmots for switching over the transmission ratio may be calibrated on a test bench, for example.

If second testing unit 65 receives a B_swintent signal that has been set, it checks, using the latest received engine speed values, whether engine speed nmot is increasing or decreasing. If it is increasing, second testing unit 65 checks whether the absolute value of instantaneous engine speed nmot is less than second speed threshold nmot2 by less than a predefined interval. If this is the case, second testing unit 65 recognizes that, due to the switching intent of transmission controller 55, there is the risk that engine speed nmot exceeds second speed threshold nmot2 due to the switchover of the transmission ratio before a switchover from half-engine operation to full-engine operation occurs, so that subsequently the switching window for switching over to full-engine operation might be too short. Therefore, in this case the output of second testing unit 65 is set. The same applies to the case where second testing unit 65 has detected a decreasing engine speed, whose absolute value is greater than first speed threshold nmot1 by less than a predefined interval. In this case, in the event of a switchover of the transmission ratio, it is to be expected that engine speed nmot will be less than first speed threshold nmot1, so that subsequently the engine oil pressure will no longer be sufficient for switching over from half-engine operation to full-engine operation. The predefined interval may be calibrated appropriately on a test bench, for example, in such a way that in the event of a switchover of the transmission ratio, the instantaneous speed is higher than second speed threshold nmot2 or lower than first speed threshold nmot1 only for an engine speed nmot whose absolute value is less than second speed threshold nmot2 or greater than first speed threshold nmot1 by less than the predefined interval.

The output of second testing unit 65 is supplied to a first triggering unit 31 and to a setting input of a second set-reset element 113. When it receives an output signal, which has been set, of second testing unit 65, first triggering unit 31 causes engine 5 to be triggered to switch the engine operating state, i.e., to switch over from the present half-engine operation into full-engine operation. When the output signal, which has been set, of second testing unit 65 has been received at the setting input of second set-reset element 113, output signal B_engcrit of second set-reset element 113 is also set. Output signal B_engcrit of second set-reset element 113 is transmitted as a status signal from engine controller 50 to transmission controller 55 and there to first function block 25 via communication channel 105.

The output signal of first set-reset element 112 in first function block 25 is supplied to a delay element 70 and to a first AND element 80. Delay element 70 may be designed as a monoflop, for example. Its output changes from the unset to the set state for a predefined period of time when it detects a rising flank at its input. The output of delay element 70 is thus brought from the unset to the set state for the predefined time period when the output of first set-reset element 112 is set. The predefined time period may be calibrated on a test bench, for example, in such a way that it is longer than the time that elapses from setting the B_swintent signal via the above-described check in second testing unit 65 until the B_engcrit signal resulting from this check is received in transmission controller 55, i.e., in first function block 25. The predefined time period ensures that it is possible to check, before a switchover of the transmission ratio, whether this switchover also results in a switchover of the engine operating state, i.e., in a switch between half-engine operation and full-engine operation. The output signal of delay element 70 is labeled B_time1 in FIG. 2. It is supplied to a NOR element 75. The B_engcrit signal received from engine controller 50 is also supplied to NOR element 75. The output of NOR element 75 is set when neither of its inputs is set; otherwise, i.e., if at least one of the two inputs is set, it is reset. The output signal of NOR element 75 is labeled B_enable in FIG. 2 and is also supplied to first AND element 80. The output of AND element 80 is labeled B_switchtr in FIG. 2 and is supplied to a second triggering unit 35, which causes the desired transmission switchover, i.e., the desired switchover of the transmission ratio when it receives, at its input, a B_switchtr signal that has been set.

Furthermore, first detection means 114 are provided, which detect a completed transmission switchover and generate a brief setting pulse in the case of the completed transmission switchover; this setting pulse is supplied to a reset input of set-reset element 112 and causes the output of first set-reset element 112 to be reset. The transmission switchover may be detected by first detection means 114 as known to those skilled in the art, for example, by analyzing the clutch state or by monitoring engine speed nmot. Similarly, second detection means 115 are provided, which detect whether a successful switchover from full-engine operation to half-engine operation has occurred by analyzing the valve gear of the cylinders of the two engine banks 15, 20, for example, i.e., by checking whether the valve gears of all cylinders are active. If this is the case, second detection means 115, which may be implemented in engine controller 50 as software and/or hardware, detect the successful switchover from half-engine operation to full-engine operation and deliver a brief setting pulse at their output, which is supplied to a reset input of second set-reset element 113 and causes the output of second set-reset element 113 and thus signal B_engcrit to be reset. Second set-reset element 113 cannot be set again until a positive flank appears at the setting input of second set-reset element 113. This also applies to setting again first set-reset element 112, whose output cannot be set again until a positive flank appears at the setting input of first set-reset element 112.

Second detection means 115 may also be designed as a timer element as an alternative, after whose expiration it is assumed that the switchover has occurred; the wait time of the timer element may be calibrated on a test bench, for example.

The valve control of the intake and exhaust valves of the cylinders of the two engine banks 15, 20 may take place, for example, electronically by engine controller 50 via a fully variable valve control or, alternatively, via camshaft control.

The valve gear may also be detected by second detection unit 115.

Alternatively, the output signal of first triggering unit 31 may also be supplied to second detection unit 115. As soon as second detection unit 115 detects a positive flank at the output of first triggering unit 31 and thus detects a setting signal of first triggering unit 31, it may start a timer element, for example, which, after the elapse of a second predefined time period, outputs the above-described reset pulse to the resetting input of second set-reset element 113.

It is assumed here that setting the output of first triggering unit 31 causes the switchover from half-engine operation to full-engine operation. This second predefined time period may be calibrated on a test bench, for example, in such a way that it is slightly longer than or equal to the time period needed from the time the positive flank is generated at the output of first triggering unit 31 until the switchover from half-engine operation to full-engine operation is completed. Similarly, the output signal of second triggering unit 35 may also be directly supplied to first detection unit 114. Setting the output signal of second triggering unit 35 will then not only cause the transmission switchover, but will also start a timer element in first detection unit 114, for example, which generates the above-described reset pulse for resetting first set-reset element 112 after the elapse of a third predefined time period. The third predefined time period may be calibrated, for example, on a test bench in such a way that it is slightly longer than the time needed from the time the output signal of second triggering unit 35 is set until the transmission switchover is completed.

Figure 3A:
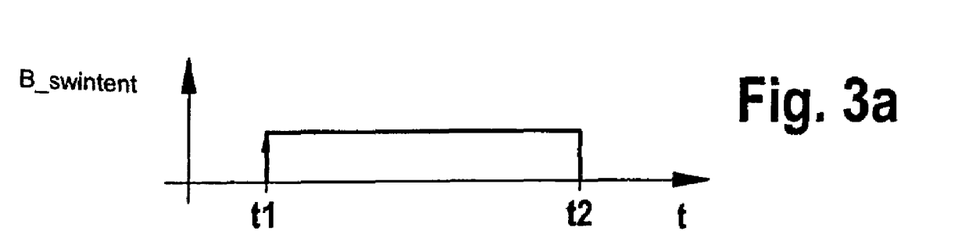
FIGS. 3a)-3e) show various graphs illustrating the signals shown in FIG. 2.
Figure 3B:
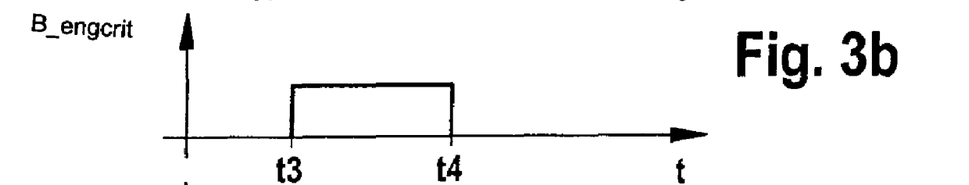
Figure 3C:
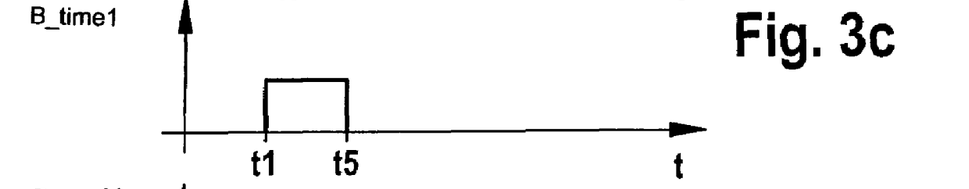
Figure 3D:
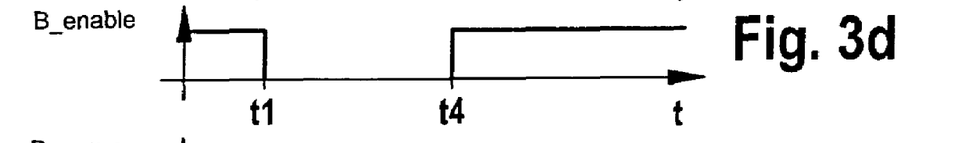
Figure 3E:
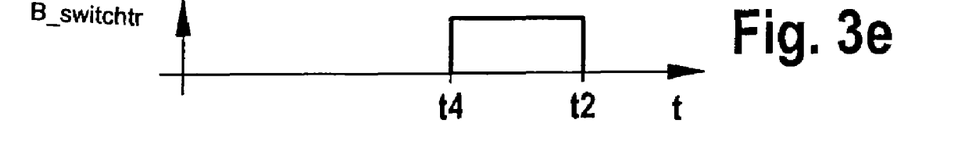

FIGS. 3a) through 3e) show exemplary signal graphs for the signals depicted in FIG. 2 for elucidating the sequence of the method according to the present invention according to the first embodiment. FIG. 3a) shows the B_swintent signal plotted against time t. At a first point in time $t_1$ it has a positive flank and it is set from there until a second point in time $t_2$. FIG. 3c) shows the B_time1 signal plotted against time t. By setting the B_swintent signal at first point in time $t_1$, the B_time1 signal is also set. The B_time1 signal remains set for the first predefined time period, which expires at a fifth point in time $t_5$. FIG. 3b) shows the B_engcrit signal plotted against time t. At a third point in time $t_3$ following first point in time $t_1$, the output of second set-reset element 113 and thus the B_engcrit signal is set. This means that from the time the B_swintent signal is set at first point in time $t_1$ through the check in second testing unit 65 to the point in time the set signal is generated at the output of second set-reset element 113, the time period $t_3-t_1$ elapses. The first predefined time period is selected in such a way that the B_engcrit signal may be set at the output of delay element 70 prior to the elapse of the first predefined time period, i.e., $t_3<t_5$. After the completed switchover from half-engine operation to full-engine operation, the B_engcrit signal is reset again at a fourth point in time $t_4$ following third point in time $t_3$ and, in this example, also fifth point in time $t_5$. FIG. 3d) shows the B_enable signal plotted against time t. This signal is set until first point in time $t_1$, reset from first point in time $t_1$ until fourth point in time $t_4$, and is subsequently set again. If the B_enable signal is set, the transmission switchover is enabled; otherwise it is blocked. The transmission switchover is therefore blocked from first point in time $t_1$ until fourth point in time $t_4$; otherwise it is enabled. Transmission switchover is therefore not enabled until the switchover from half-engine operation to full-engine operation has been completed. The B_switchtr signal, which is shown plotted against time t in FIG. 3e), is thus set from fourth point in time $t_4$ until second point in time $t_2$ and thus causes the transmission switchover at fourth point in time $t_4$. Transmission switchover does not therefore take place until the switchover from half-engine operation to full-engine operation has been completed. The blocking of the transmission switchover may be overridden by higher-priority requests, for example, for a forced gear switch.

Figure 4:
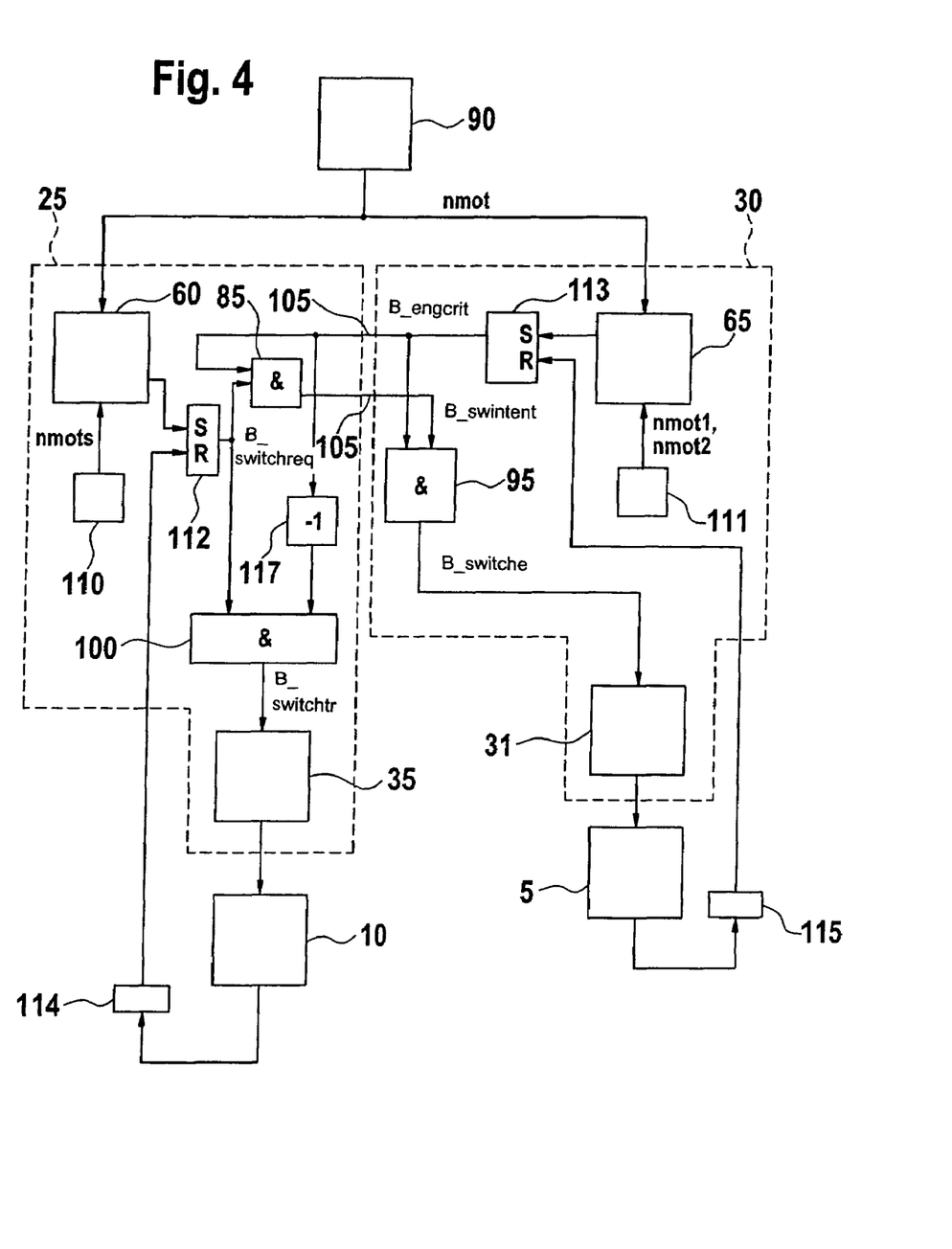
FIG. 4 shows a function diagram illustrating a second example embodiment of the present invention.

FIG. 4 shows the function diagram of a second example embodiment of the present invention in which the same reference numerals denote the same elements as in FIG. 2. The structure of the function diagram in FIG. 2 is substantially identical to the structure of the function diagram of FIG. 4, with the exception that the two embodiments differ in the first function block 25 and in the second function block 30. Unlike in the first example embodiment according to FIG. 2, in the second example embodiment according to FIG. 4 the output signal of first set-reset element 112 is labeled B_switchreq and is supplied to a second AND element 85. In addition, the B_engcrit signal is supplied from the output of second set-reset element 113 to second AND element 85 of first function block 25 via communication channel 105. The check in second testing unit 65, described previously for the first embodiment, now takes place continuously and not only after the B_swintent switching intent signal is received in second function block 30. The B_engcrit signal at the output of second set-reset element 113 is also supplied to a third AND element 95 in second function block 30. The output of second AND element 85 now represents the B_swintent switching intent signal and is transmitted from first function block 25 to second function block 30 and there to another input of third AND element 95, via communication channel 105. The output signal of third AND element 95 is labeled B_switche in FIG. 4 and is supplied to first triggering unit 31. Setting the B_switche signal causes first triggering unit 31 to switch over from half-engine operation to full-engine operation. The B_engcrit signal, received in first function block 25, is also supplied to a negation element 117 of first function block 25, which inverts the B_engcrit signal, i.e., transforms it from the set to the reset state or from the reset to the set state. The output of negation element 117 is supplied to a fourth AND element 100. The B_switchreq signal at the output of first set-reset element 112 is also supplied to fourth AND element 100. The B_switchtr signal is the output of fourth AND element 100 and is supplied to second triggering unit 35, causing the transmission switchover to be set.

The functioning of the second example embodiment is explained in connection with the signal graphs of FIGS. 5a) through 5e).

Figure 5A:
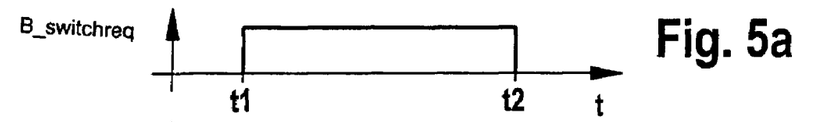
FIGS. 5a)-5e) show various graphs illustrating the signals shown in FIG. 4.
Figure 5B:
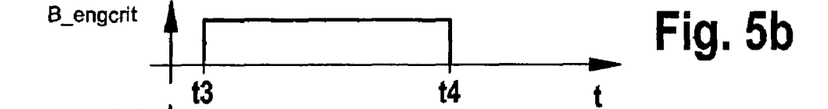
Figure 5C:
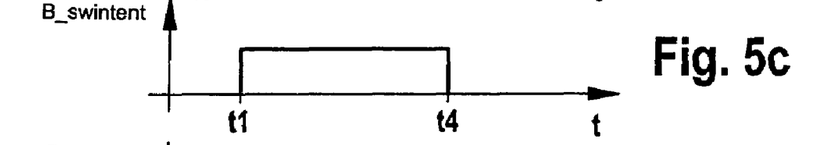
Figure 5D:
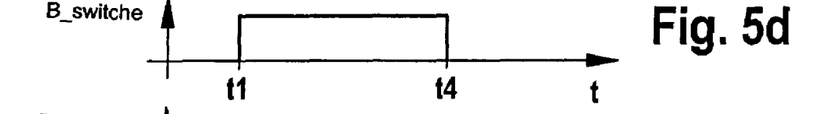
Figure 5E:
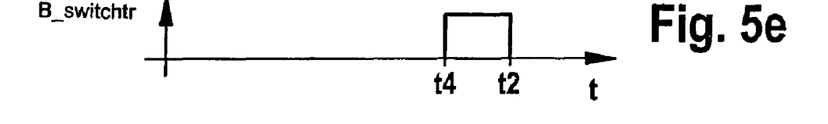

FIG. 5a) shows the B_switchreq signal plotted against time t; its shape corresponds to the shape of the B_swintent signal according to FIG. 3a). FIG. 5b) again shows the B_engcrit signal plotted against time t. The B_engcrit signal is set at. third point in time $t_3$, which is before first point in time $t_1$ in the example of FIG. 5b). Second testing unit 65 has thus detected an instantaneous engine speed nmot whose absolute value is either smaller than second speed threshold nmot2 by less than the predefined interval or greater than the first speed threshold nmot1 by less than the predefined interval. At third point in time $t_3$, second testing unit 65 has thus detected an operating state of the drive unit which would result in an undesirable engine speed jump in the event of a transmission switchover. This state continues through first point in time $t_1$, at which first testing unit 60 has generated a transmission switchover request by setting the B_switchreq signal. FIG. 5c) shows the B_swintent signal, resulting from the two signals B_switchreq and B_engcrit at the output of second AND element 85, plotted against time t. It is thus also set at first point in time $t_1$. At fourth point in time $t_4$, the B_engcrit signal, and with it the B_swintent signal, is reset due to the switchover that has occurred from half-engine operation to full-engine operation. FIG. 5d) shows the B_switche signal, resulting from the AND-ing of the B_engcrit and B_swintent signals, plotted against time t. The B_switche signal is thus also set at first point in time $t_1$ and reset at the subsequent fourth point in time $t_4$. Switchover from half-engine operation to full-engine operation is thus not caused in the critical engine operating state described using the predefined interval regarding the position of the instantaneous engine speed nmot with respect to first speed threshold nmot1 or second speed threshold nmot2 until there is also an actual switching intent by transmission controller 55 in the form of the B_swintent signal that has been set. Switchover from half-engine operation to full-engine operation is completed at fourth point in time $t_4$, so that at this time the B_engcrit signal, and with it also the B_swintent signal and the B_switche signal, are reset. FIG. 5e) shows the B_switchtr signal plotted against time t. It is set when the B_engcrit signal is reset and thus switchover from half-engine operation to full-engine operation has occurred, and therefore causes the transmission switchover to start at fourth point in time $t_4$; this switchover is completed at the subsequent second point in time $t_2$, and thus results in the B_switchreq signal and thus also the B_switchtr signal being reset at second point in time $t_2$. In this way it is ensured, also in the second embodiment, that the switchover from half-engine operation to full-engine operation is completed prior to the transmission switchover.

It is thus checked in both example embodiments whether a switch between two transmission operating states, i.e., two transmission ratios, results in a shift of engine speed nmot over one of the two speed thresholds nmot1, nmot2 for switching between half-engine operation and full-engine operation. In the case of a positive check result, the switch between the two transmission operating states is delayed at least until a switch between half-engine operation and full-engine operation has occurred. In the first example embodiment, this check, which takes place in second testing unit 65, is performed only when a switching intent between the two transmission operating states exists, which is represented by the positive flank of the B_swintent signal. In the case of a positive check result, the output signal of second testing unit 65 is set as described above, causing switchover from half-engine operation to full-engine operation. In both example embodiments, switching between the two transmission operating states is delayed by a waiting time which is at least as long as the time required for the switchover from half-engine operation to full-engine operation. According to the second example embodiment, switching intent B_swintent for switching between the two transmission operating states is generated only when it has been previously found that the absolute value of the engine speed nmot is less than the second speed threshold nmot2 or more than the first speed threshold nmot1 by less than the predefined interval, this finding being represented by setting the B_engcrit signal. The predefined interval is calibrated as described above, for example, in such a way that only for an engine speed value which differs from the first speed threshold nmot1 or the second speed threshold nmot2 as described above by less than the predefined interval, a shift of the engine speed over the first speed threshold nmot1 or the second speed threshold nmot2 is to be expected for switchover from half-engine operation to full-engine operation due to a switch between the two transmission operating states.

It is ensured, in both example embodiments, that switching between the two transmission operating states does not occur until it is enabled after the switchover from half-engine operation to full-engine operation has been completed. This enable is caused by resetting second set-reset element 113 as described above.

In the first example embodiment, the above-described waiting time is generated by delay element 70 and NOR element 75. In the second example embodiment, this waiting time is generated by fourth AND element 100.

Furthermore, first testing unit 60 checks, by comparing the latest ascertained engine speed values with the threshold values nmots as known to those skilled in the art, whether the transmission is to be switched up or down. In the case the transmission is to be switched up, a B_swintentup signal is set from first testing unit 60 to second testing unit 65 via communication channel 105. In the case of an intent to switch down the transmission, a B_swintentdown signal is set from first testing unit 60 to second testing unit 65 via communication channel 105. Second testing unit 65 sets the signal at its output only if the absolute value of instantaneous engine speed nmot is less than second speed threshold nmot2 by less than the predefined interval and the B_swintentdown signal is set. This means that there is a switching intent according to which the transmission is to be switched down and thus the engine speed is to be increased. Similarly, the output of second testing unit 65 is set if the absolute value of the instantaneous engine speed is greater than the first speed threshold nmot1 by less than the predefined interval and the B_swintentup signal is set. In this case the transmission is to be switched up, so that after the switch the engine speed is reduced from its previous value.

The B_swintentup and B_swintentdown signals are no longer provided in the second example embodiment according to FIG. 4, so that an unnecessary switchover from half-engine operation to full-engine operation may possibly occur, for example, if the absolute value of instantaneous engine speed nmot is less than second speed threshold nmot2 by less than the predefined interval and the B_swintent signal is set because transmission 10 should be switched up. In this case the switchover from half-engine operation to full-engine operation takes place first prior to the transmission switchover. However, if, after the subsequent transmission switchover, engine speed nmot is still less than second speed threshold nmot2, a switch back from full-engine operation to half-engine operation takes place again.

The method according to the present invention and the device according to the present invention ensure that a required switchover from half-engine operation to full-engine operation may be performed without potentially damaging the switching mechanism.

In general, first component 5 and second component 10 may be any desired components of drive unit 1, the drive unit being operated as a function of at least one first performance quantity of drive unit 1 in different operating states of first component 5 having different configurations of first component 5, and drive unit 1 being operated as a function of at least one second performance quantity in different operating states of the second component in different configurations of the second component. A switch takes place between two operating states of first component 5 having different configurations of first component 5 as a function of the at least one first performance quantity of drive unit 1. A switch takes place between two operating states of second component 10 having different configurations of second component 10, as a function of the at least one second performance quantity of drive unit 1. It is checked whether switching between two operating states of second component 10 results in a shift of the at least one first performance quantity over a switching threshold for switching between two operating states of first component 5. In this case of a positive check result, the switch between the two operating states of second component 10 is delayed at least until a switch between the two operating states of first component 5 has occurred.

In the example described above, first component 5 is the engine and second component 10 is the transmission. Furthermore, in the above-described example, the first performance quantity is equal to the second performance quantity and equal to the engine speed. Since, according to FIG. 6, the operating state of the engine is also a function of the engine torque, the operating state of the engine, i.e., in the above-described example, the setting of half-engine operation or full-engine operation, is a function not only of the engine speed, but also of the engine torque. For example, a switch between half-engine operation and full-engine operation may take place as a function of the engine torque, and a switch between different transmission ratios may take place as a function of the engine speed, so that the first performance quantity and the second performance quantity may also be selected to be different. Furthermore, first component 5 may be designed as a transmission and second component 10 may be designed as an engine, so that it is checked whether a switch between two engine operating states, i.e., for example, between half-engine operation and full-engine operation, results in a shift of the engine speed over a switching threshold for switching between two transmission operating states and, in this case of a positive check result, the switch between the two engine operating states, i.e., between half-engine operation and full-engine operation, is delayed at least until a switch between the two transmission operating states has occurred. Other drive unit components different from those described, which may be operated in at least two different operating states as a function of a performance quantity of the drive unit, may also be provided as first component 5 and second component 10. Thus, an electronic stability program, a traction control system, and an antilock system, etc., may also be selected as one of the two components 5, 10. Different operating states of these components may be differentiated, for example, by these components being activated or not, i.e., whether or not they are requesting a torque as a function of the slip of the driving wheels, for example, as the performance quantity of the drive unit.

If first component 5 is designed as a transmission and second component 10 as an engine, it would have to be checked, for example, whether switching between half-engine operation and full-engine operation results in a shift of the engine speed over a switching threshold for switching between two transmission operating states, in which case the switch between the two engine operating states is delayed at least until a switch between the two transmission operating states has occurred. If first component 5 was designed as a transmission and second component 10 as a traction control system, it may be checked, for example, whether switching between two operating states of the traction control system results in a shift of the engine speed over a switching threshold for switching between half-engine operation and full-engine operation, in which case the switch between the two operating states of the traction control system is delayed at least until a switch between half-engine operation and full-engine operation has occurred. Different operating states of the traction control system may be characterized by different drive torques and thus different engine speeds.

Regardless of the selection of first component 5 and second component 10, the function diagrams of FIGS. 2 and 4 may be used in a similar manner.

The transmission ratio is actually set as a function of the transmission output speed, which, however, is rigidly linked to the engine speed via the transmission ratio, so that in the above description the engine speed was used as a criterion for the switchover of the transmission ratio.

What is claimed is:

1. A method for operating a drive unit having a first component and a second component, comprising:
    operating the drive unit as a function of at least one first performance quantity of the drive unit in a plurality of operating states of the first component having corresponding plurality of configurations of the first component;
    operating the drive unit as a function of at least one second performance quantity of the drive unit in a plurality of operating states of the second component having corresponding plurality of configurations of the second component;
    initiating a switching between two operating states of the first component having different configurations of the first component, as a function of the at least one first performance quantity of the drive unit;
    initiating a switching between two operating states of the second component having different configurations of the second component, as a function of the at least one second performance quantity of the drive unit;
    determining whether the switching between the two operating states of the second component results in a shift of the at least one first performance quantity over a predetermined switching threshold for switching between the two operating states of the first component; and
    if the shift of the at least one first performance quantity over the predetermined switching threshold is determined, delaying the switching between the two operating states of the second component at least until the switching between the two operating states of the first component has been completed.

2. The method as recited in claim 1, wherein the switching between the two operating states of the second component is delayed for a waiting period that is at least as long as a time required for the switching between the two operating states of the first component.

3. The method as recited in claim 1, wherein the at least one first performance quantity is equal to the at least one second performance quantity, and wherein the at least one first performance quantity is an engine speed.

4. The method as recited in claim 1, wherein the determining is performed in response to an indication of a switching intent for the switching between the two operating states of the second component.

5. The method as recited in claim 4, wherein, if the shift of the at least one first performance quantity over the predetermined switching threshold is determined, the switching between the two operating states of the first component is performed.

6. the method as recited in claim 4, wherein the indication of the switching intent is generated only if the at least one first performance quantity is within a predefined range from the switching threshold.

7. The method as recited in claim 6, wherein the predefined range is selected in such a way that a shift of the at least one first performance quantity over the switching threshold for switching between the two operating states of the first component occurs only if the at least one first performance quantity is within the predefined range.

8. The method as recited in claim 1, wherein the switching between the two operating states of the second component is not performed until after an enable step, and wherein the enable step occurs after the switching between the two operating states of the first component has been completed.

9. The method as recited in claim 8, wherein the plurality of operating states of the first component has different numbers of operating engine cylinders.

10. The method as recited in claim 1, wherein the first component is an engine and the second component is a transmission.

11. The method as recited in claim 10, wherein the plurality of operating states of the transmission has different transmission ratios.

12. A system for operating a drive unit having a first component and second component, comprising:
- a control arrangement, wherein the control arrangement controls:
- a) operating the drive unit as a function of at least one first performance quantity of the drive unit in a plurality of operating states of the first component having corresponding plurality of configurations of the first component;
- b) operating the drive unit as a function of at least one second performance quantity of the drive unit in a plurality of operating states of the second component having corresponding plurality of configurations of the second component;
- c) initiating a switching between two operating states of the first component having different configurations of the first component, as a function of the at least one first performance quantity of the drive unit; and
- d) initiating a switching between two operating states of the second component having different configurations of the second component, as a function of the at least one second performance quantity of the drive unit;
- a testing arrangement for determining whether the switching between the two operating states of the second component results in a shift of the at least one first performance quantity over a predetermined switching threshold for switching between the two operating states of the first component; and
- a delay arrangement for delaying, if the shift of the at least one first performance quantity over the predetermined switching threshold is determined, the switching between the two operating states of the second component at least until the switching between the two operating states of the first component has been completed.

* * * * *